Jan. 19, 1943.  M. MAUL  2,308,928
CONTROL ELEMENT FOR STATISTICAL MACHINES
Original Filed Feb. 4, 1939  5 Sheets-Sheet 1
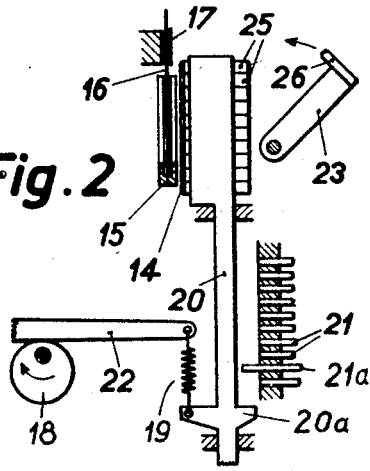
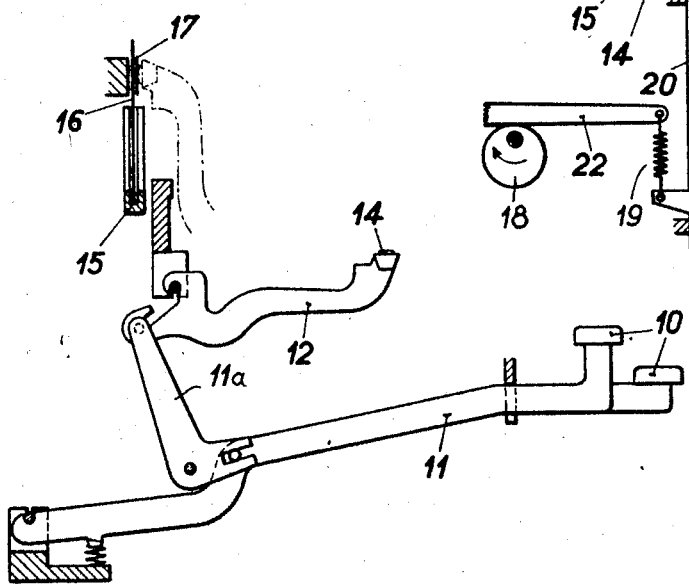
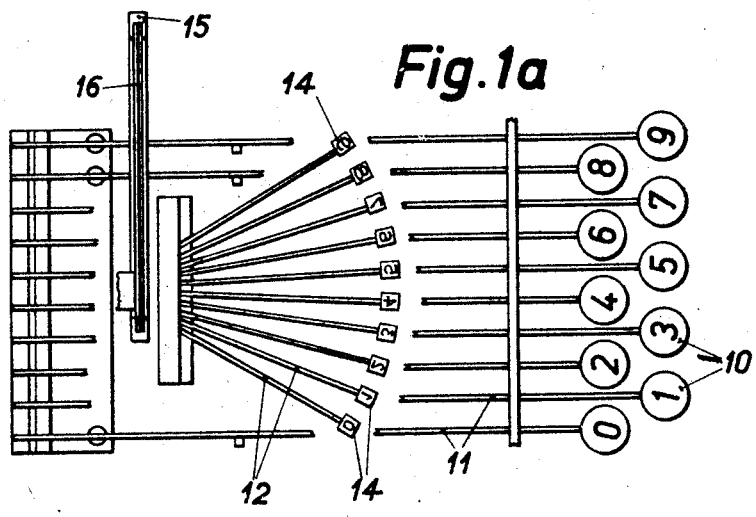
INVENTOR
Michael Maul
BY
W. M. Wilson
ATTORNEY Jan. 19, 1943.                M. MAUL                    2,308,928
              CONTROL ELEMENT FOR STATISTICAL MACHINES
                Original Filed Feb. 4, 1939     5 Sheets-Sheet 2

INVENTOR
Michael Maul
BY
ATTORNEY

Jan. 19, 1943. M. MAUL 2,308,928
CONTROL ELEMENT FOR STATISTICAL MACHINES
Original Filed Feb. 4, 1939   5 Sheets-Sheet 3

1 2 3 4 5
6 7 8 9 0

INVENTOR
Michael Maul
BY
ATTORNEY

Jan. 19, 1943.   M. MAUL   2,308,928
CONTROL ELEMENT FOR STATISTICAL MACHINES
Original Filed Feb. 4, 1939   5 Sheets-Sheet 4
Fig. 5
Fig. 5a
| 64 | 68 | 79.5 | 82.5 | 82.5 | 84 | 84 | 87.5 | 88 | 100 |
|---|---|---|---|---|---|---|---|---|---|
| 1 | 7 | 3 | 0 | 5 | 6 | 4 | 9 | 2 | 8 |
Fig. 6
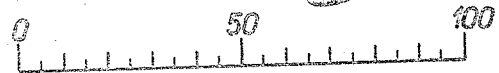
Fig. 6a
| 65 | 67 | 79 | 81.5 | 84 | 84 | 85.5 | 91.5 | 91.5 | 100 |
|---|---|---|---|---|---|---|---|---|---|
| 1 | 7 | 4 | 3 | 2 | 5 | 0 | 6 | 9 | 8 |
INVENTOR
Michael Maul
BY
ATTORNEY Jan. 19, 1943.     M. MAUL     2,308,928
CONTROL ELEMENT FOR STATISTICAL MACHINES
Original Filed Feb. 4, 1939     5 Sheets-Sheet 5
Fig. 7
1 2 3 4 5
6 7 8 9 0
Fig. 7a
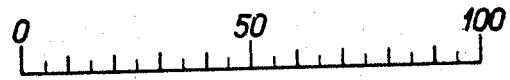
| 43 | 61,5 | 71,5 | 75 | 78 | 80 | 87 | 87 | 90 | 100 |
|----|------|------|----|----|----|----|----|----|-----|
| 1  | 7    | 4    | 2  | 3  | 0  | 6  | 9  | 5  | 8   |
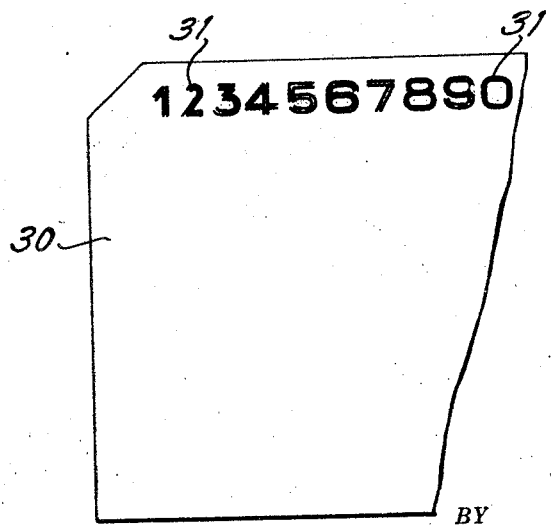
Fig. 8
INVENTOR
Michael Maul
BY
ATTORNEY Patented Jan. 19, 1943

2,308,928

UNITED STATES PATENT OFFICE 2,308,928

CONTROL ELEMENT FOR STATISTICAL MACHINES

Michael Maul, Berlin-Johannisthal, Germany; vested in the Alien Property Custodian Original application February 4, 1939, Serial No. 254,524. Divided and this application July 21, 1939, Serial No. 285,732

2 Claims. (Cl. 235—61.12)

The present invention relates to a control element for controlling statistical machines and more particularly to a record medium or carrier adapted for handling in such machines which is provided with graphical characters for controlling the statistical operations of the machines in accordance with the different values of the said characters. The instant application is a division of the copending application, Serial No. 254,524, filed February 4, 1939.

In accounting in the most general sense, i. e., in bookkeeping and statistical work, one is concerned chiefly with the compilation of the data of data carriers. Compilation may be effected in several different ways such as by assorting according to certain characters and/or numbers, or by accumulation of the numbers, or by assorting and accumulation, or by subtraction or multiplication. The data carriers may assume the form of tickets, cards, or strips and the data contained thereon can be provided in such manner that control of the statistical machines is accomplished by virtue of the physical characteristics of the data.

At present the best known and most widely used mechanical compilation of data takes place in the perforated record card system in which the data is represented by selectively positioned perforations in cards. The perforated cards are analyzed by brushes which make electrical contact through the perforations to effect control of the machines, such as assorting and tabulating machines, in accordance with the meaning of the data.

Now it has already been suggested to depart from the perforated card system for the representation of data for the control of the machines by representing the data by graphical characters printed on cards and to use said graphical characters for the direct control thereof. The use of graphical characters greatly facilitates reading of the data which is to be used for control purposes. Since the graphical characters must cause a differential control depending upon their meaning, they must also differ in a certain manner perceivable by the machines and the type of a printing device for such graphical characters must be provided accordingly. Among the known suggestions is one in which the area of the numerical characters increases with the different numbers in such manner that the numeral 0 has the smallest and the numeral 9 the largest area, and the areas of all numerals increase in equal steps in the sequence of the order of the numerals (see U. S. Patent No. 1,853,443). Because of these differences the control of machines can be accomplished in accordance with the meaning of the characters by light analysis thereof using a photo-electric cell. However, with the characters formed according to this known suggestion with some very thick numbers and the graduation of the areas in the sequence of the values of the numerals, a rather unpleasant picture is obtained which may also be inconvenient in practical use.

The present application describes a printing device the type of which are so shaped that the type, and therefore the characters printed by them, differ from each other by gradually increasing areas. However, in the present case the characters provided on the record medium are such that the graduation of the selected and predetermined areas of the characters with which the instant invention is concerned is not provided in the sequence of the values of the numerals, i. e., not in the sequence of the numerals 0–9, but independently of the value of the numerals in a sequence in which the differences of area which already exist in a certain degree in known type are utilized. In such small characters as in the usually applied type, it is very desirable for the purpose of the mechanical compilation that the width of the type portions forming the character lines is constant. In consideration of this circumstance, the characters printed on the record medium according to the present invention are formed so that the outlines or configurations of the different characters are equal in width for all the characters but are so shaped that they differ from each other independently of their meaning or value by different and about equally spaced lengths of their middle-line. By middle-line is meant an imaginary line passing through the middle of all the lines making up the character, as will be further explained in connection with the drawings. If only numerical characters are used, the shapes of the characters are such that they have equally graduated middle-line lengths running from the shortest middle-line character (for instance "1") to the longest middle-line character (for instance "8"). Of course, the provision of the characters according to the invention may also be applied to characters of any meaning and/or form, being restricted neither to the Arabic numerical characters illustrated, nor to numerical characters solely.

It is therefore an object of the present invention to provide a record medium which is adapted for controlling statistical machines and upon which medium are disposed different characters for controlling the various operations of the machines in accordance with the meanings thereof, the outlines or configurations of said characters being of constant widths yet having different middle line lengths whereby the characters differ from each other in the areas of the said middle line lengths.

Another object is the provision of a record medium having different characters disposed thereon for controlling the different operations of statistical machines and wherein the middle line lengths of the different characters differ from the shortest to the longest in substantially equally graduated steps independently of the meaning of the characters.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 shows diagrammatically a section of a typewriter-like printing mechanism.

Fig. 1a is a top view of the device shown in Fig. 1.

Fig. 2 shows diagrammatically in partial section an alternate printing device with type bars.

Figs. 5, 6 and 7 are prints of known shapes of type in a very enlarged scale.

Figs. 5a, 6a and 7a show the scale for the middle-line lengths of the characters of Figs. 5, 6 and 7 respectively, and a table giving the lengths of the middle-lines for the various numerals.

Fig. 8 shows part of a record medium comprising a statistical card having the different characters which form the present invention disposed thereon.

Figure 3:
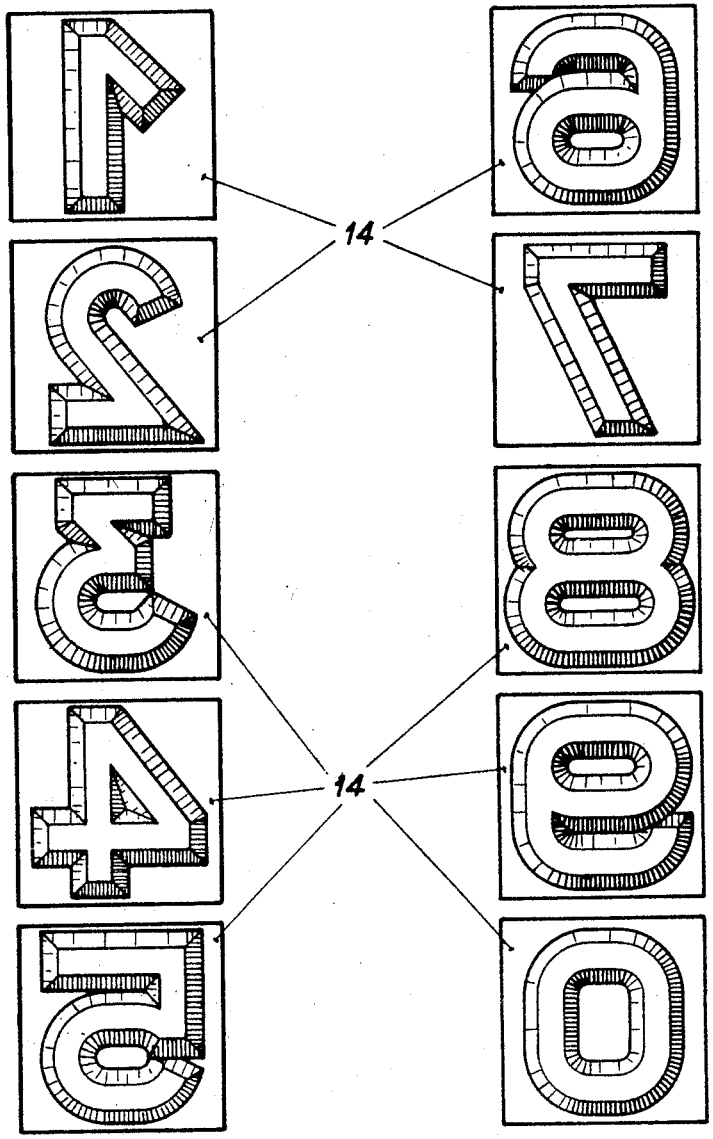
Fig. 3 shows in a very enlarged scale the set of numeral type as they are used in the devices shown in Figs. 1, 1a and 2.

Before describing the record medium which is the subject matter of the instant invention, a brief description of suitable printing devices will be made. In Figs. 1 and 1a a typewriter-like device has been illustrated and in order for the description to be brief is shown to be adapted only for printing numerals. Accordingly, this device shows a set of numeral keys 10 adapted to actuate the rock levers 12 through key levers 11 and intermediate levers 11a. On the rock levers 12 are arranged the type bodies 14 shown in a greatly enlarged scale in Fig. 3. Upon actuation of a key, the corresponding type of the type body 14 will be moved, together with the ribbon 17, against the data carrier provided in this instance as card 16, and the corresponding numeral will be printed thereupon. The carriage 15 carrying the card 16 is shifted step by step in the manner well known in the typewriter art.

In Fig. 2, a printing device with type bars as often used in statistical machines has been illustrated. A series of stops 21 is provided with each stop being movable to the position of 21a by operation of a corresponding control element (not shown). A lever 22 engages cam 18 to be raised thereby and acts through springs 19 to raise type bar 20. Mounted on the upper end of type bar 20 is a series of elements 25 carrying type 14 on their ends for cooperation with a ribbon 17 to print upon card 16 in carriage 15. Type bar 20 will be raised until portion 20a engages stop 21a to position the desired element 25 for printing by the type carried thereby. Hammer 26, carried on pivoted lever 23, will then be moved to strike the selected element 25 to effect printing of the desired character. Only one type bar may be provided and the carriage 15 in Fig. 2 may be shifted step by step. However, it is also quite possible, as is also known in statistical machines, to provide a plurality of rows of keys and a plurality of type bars which are simultaneously adjusted to effect printing of several characters.

Figures 4, 4A:
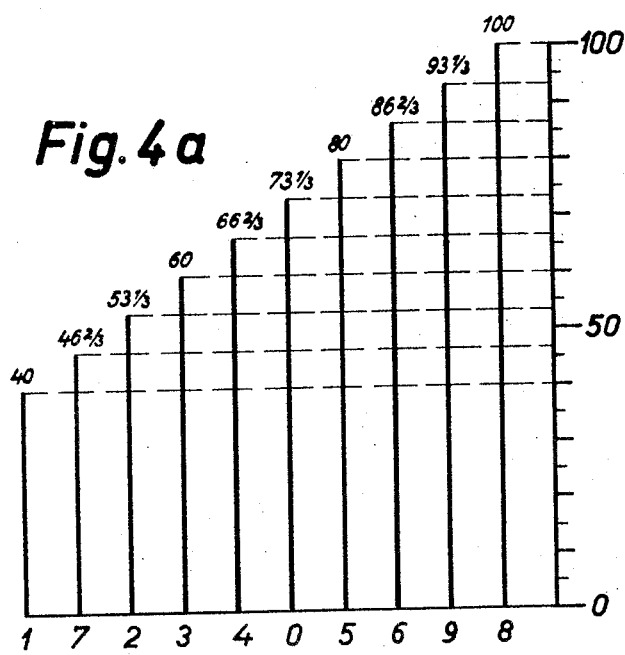
Fig. 4 shows a print of the numeral type in Fig. 3 in the same scale as Fig. 3.
Fig. 4a shows diagrammatically the lengths of the middle-lines co-ordinated to the different numeral type.

In Fig. 3, the type bodies are shown in front view in a greatly enlarged scale and Fig. 4 shows a print of the type of Fig. 3. In Fig. 8 a suitable control element for controlling the operations of statistical machines is shown comprising a record card 30 and being provided with the characters 31 which are formed by the described type elements. The said record card may be similar to the "Hollerith" type of record card in use today for controlling the operations of well known type of statistical machines. In the numeral characters of Figs. 4 and 8, the middle-lines are indicated by thin white lines. These white lines are so inscribed as to make it obvious that since the widths of the character lines are constant and equal, the total length of the white lines of each character is an exact measure for the area of the character.

In the diagram in Fig. 4a the rectified middle-line lengths of the different numerals are shown. In the lower part of the diagram the various numerals are indicated and above each numeral a black line indicates the length of the rectified middle-line developed from the characters shown in Figs. 4 and 8. The arrangement is such that the longest middle-line, in the present instance the middle-line of the numeral 8, is designated as hundred units; the middle-line of the numeral 1 results then in 40 units and between these limits the middle-line lengths of the other numerals are correspondingly equally graduated. On the upper end of each middle-line length, Fig. 4a, is shown the respective measure number for the middle-line length. It may be easily seen therefrom that the lengths are equally graduated.

Generally, it is not necessary to show known arrangements also in the drawings to compare them with the invention. However, in the present instance, a comparison of known printing type with the invention is difficult and inconvenient because only in an enlarged scale of the type and character is a comparison and a proper judgment possible. Therefore, in the present instance the characters which are obtained with some known forms of type are shown in an enlarged scale and the relations with regard to their middle-lines are set down in tables. The numerals printed by a Remington portable typewriter are shown as enlarged in Fig. 5. Fig. 6 shows, also in a greatly enlarged scale, the numerals printed by a standard "Continental" typewriter, and Fig. 7 shows in an enlarged scale a German standardized type (DIN 1451, medium print).

In Figs. 5, 6 and 7 the middle-line is indicated as a thin white line and the inscriptions have been made in such manner that in view of the constant width of the lines of each type, the length of the middle-line is a measure of the area of the character. It is to be noted that due to the rounded end portions in Figs. 5 and 6 the middle-lines have not been drawn entirely to the ends of the characters in order to obtain a correction for the loss of area in the before mentioned rounded end portions.

Now if the length of the longest middle-line, that of numeral 8, is set at 100 and the lengths of the middle-line of the remaining numerals are measured in that scale, the characters of Figures 5, 6 and 7 will have the middle-line lengths shown in the corresponding tables (Figs. 5a, 6a and 7a). Examination of these tables will disclose that in each set of numerals there will be at least two characters having the same middle-line lengths and that the difference between the lengths of some of the others is quite insignificant. It is also obvious that the difference in lengths is very irregular.

In contrast, it will be recalled that the characters shown in Figs. 4 and 8 have middle-line lengths increasing in equal steps from the shortest to the longest without regard for the value of the characters.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A control element adapted for controlling the operations of statistical machines comprising a record medium having different graphical characters of the numeral series 0 through 9 disposed thereon, the lines forming said characters having light-modifying properties in relation to character field, and being of constant width in a character and the same width for all characters but the different characters having different middle-line lengths whereby the characters differ from each other in their areas and hence in their light-modifying properties, the character 8 having the longest and the character 1 having the shortest middle-line with the remaining characters being provided with middle-line lengths between those of the 1 and 8 in substantially equally graduated steps.

2. The invention set forth in claim 3 wherein the said characters have middle-line lengths increasing in the sequence 1—7—2—3—4—0—5—6—9—8.

MICHAEL MAUL.